United States Patent
Mc Kinnon et al.

(10) Patent No.: US 6,448,503 B1
(45) Date of Patent: Sep. 10, 2002

(54) LINE SPACE FOR POWER TRANSMISSION LINES

(75) Inventors: Bruce Raymond Mc Kinnon, Auckland; Owen Gregory, Kihikihi, both of (NZ)

(73) Assignee: Tyco Electronics Logistics A.G. (CH)

( * ) Notice: Subject to any disclaimer, the term of this patent is extended or adjusted under 35 U.S.C. 154(b) by 0 days.

(21) Appl. No.: 09/830,204

(22) PCT Filed: Nov. 2, 1999

(86) PCT No.: PCT/NZ99/00180

§ 371 (c)(1),
(2), (4) Date: Aug. 7, 2001

(87) PCT Pub. No.: WO00/27009

PCT Pub. Date: May 11, 2000

(30) Foreign Application Priority Data

Nov. 2, 1998 (NZ) .................................................. 332618

(51) Int. Cl.⁷ .................................................. H02G 7/12
(52) U.S. Cl. ..................................... 174/146; 174/40 R
(58) Field of Search ................................. 174/40 R, 41, 174/42, 146, 40 CC, 40 TD, 43, 44, 45 TD; 248/61; 403/119, 161, 346, 374.5; 24/132 R

(56) References Cited

U.S. PATENT DOCUMENTS

| | | | | | |
|---|---|---|---|---|---|
| 912,277 | A | * | 2/1909 | Benson ....................... 403/161 |
| 2,825,751 | A | * | 3/1958 | Flower ........................ 174/146 |
| 2,891,751 | A | * | 6/1959 | Raypholtz .................... 174/146 |
| 3,070,651 | A | * | 12/1962 | Semple et al. .............. 174/146 |
| 3,586,292 | A | * | 6/1971 | Buck .......................... 254/131 |
| 3,617,609 | A | * | 11/1971 | Tuttle ......................... 174/146 |
| 3,743,762 | A | | 7/1973 | Annas et al. |
| 3,870,815 | A | * | 3/1975 | Hawkins ...................... 174/146 |
| 3,924,055 | A | * | 12/1975 | Moore et al. ............... 174/146 |
| 3,925,595 | A | * | 12/1975 | Hawkins ...................... 174/146 |
| 3,963,855 | A | * | 6/1976 | Hawkins et al. ............ 174/146 |
| 4,525,596 | A | * | 6/1985 | Diana .......................... 174/146 |
| 4,554,403 | A | * | 11/1985 | Hearnshaw .................. 174/146 |
| 4,565,038 | A | * | 1/1986 | Milbright et al. ............. 52/146 |

FOREIGN PATENT DOCUMENTS

| | | |
|---|---|---|
| DE | 7414020 | 7/1974 |
| EP | 0379446 | 7/1990 |

* cited by examiner

Primary Examiner—Dean A. Reichard
Assistant Examiner—Adolfo Nino
(74) Attorney, Agent, or Firm—Dean W. Russell; Kristin L. Johnson; Kilpatrick Stockton LLP

(57) ABSTRACT

A line spacer for use between power transmission lines to maintain the lines at a set spacing front each other includes at least two spaced jaws and a lever action closure mechanism operable to close the jaws after engaging of the spacer onto adjacent lines, to fix the spacer in position between the lines.

7 Claims, 1 Drawing Sheet

LINE SPACE FOR POWER TRANSMISSION LINES

FIELD OF INVENTION

The invention comprises a line spacer typically for use between power transmission lines spanning between pylons, to maintain individual lines at a set spacing from each other.

BACKGROUND OF INVENTION

Typically such line spacers are fitted to high voltage power lines at regular spacings along the lines lengthwise between pylons or other line supports, to ensure that individual lines do not move relative to one another and touch during periods of high wind loading, earthquakes or similar. Typically spacers extend between two adjacent lines and encircle each at either end of the spacer. A triple or larger spacer may be used to space three or more lines from each other.

U.S. Pat. No. 3,743,962 discloses a spacer for fitting between parallel conductors having jaws at each end forming a conductor clamp at each end of the bar members. The two bar members are bolted together after fitting in position between two conductors.

Line spacers are fitted after the lines have been strung between pylons. A common practice is for a workman to fit the spacers between pairs of lines while working from an adjacent helicopter. This may require that the workman fits the spacer and then uses a spanner or other tool to close the spacer about the lines.

SUMMARY OF INVENTION

The invention provides an improved or at least alternative form of line spacer, for use between power transmission lines or in similar applications.

In broad terms the invention comprises a spacer for use between lines to maintain the lines at a set spacing from each other, including at least two spaced jaws and a lever action closure mechanism operable to close the jaws after engaging of the spacer onto adjacent lines to fix the spacer in position between the lines.

Preferably each pair of jaws comprises a fixed jaw part and a movable jaw part which is slidably moved by the lever action closure mechanism to close the moving jaw part against the fixed jaw part.

Preferably a twin spacer comprises two fixed jaw parts provided one at either end of a spacer member connecting the fixed jaw parts and two movable jaw parts slidingly carried by said spacer member between the fixed jaw parts. Preferably the lever action closure mechanism operates between the two movable jaw parts to slidingly move each away from the other and towards two fixed jaw parts to close the line spacer.

BRIEF DESCRIPTION OF THE DRAWINGS

A preferred form of spacer of the invention is shown in the accompanying drawings by way of example and without intending to be limiting, wherein.

DETAILED DESCRIPTION OF PREFERRED FORM

Figure 1:
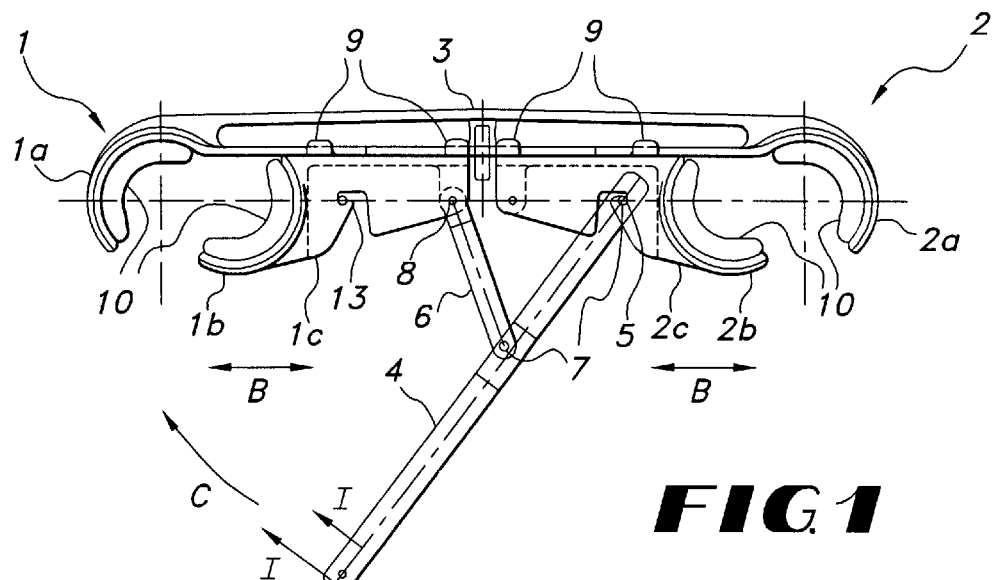
FIG. 1 is the view of the preferred form spacer from one side with the closure lever and jaws open.

The preferred form line spacer shown in the drawings is a twin spacer intended to be fitted between two overhead power transmission lines, or pairs of lines, to space the lines from each other, and comprises two pairs ofjaws generally indicated at 1 and 2 in FIG. 1. The pairs of jaws comprise fixed jaw parts 1a and 2a respectively, and movable jaw parts 1b and 2b. The fixed jaw parts 1a and 2a are carried at either end of a spacer body member 3, on which the movable jaw parts 1b and 2b are slidably mounted, so that the movable jaw parts 1b and 2b may move in the direction of arrows B during operation of a lever action closure mechanism which operates between the jaw pairs 1 and 2.

The closure mechanism comprises closure lever 4 pivotally engaged with one of the movable jaw parts 2b and link 6 -pivotally connected to the closure lever 4 intermediate of its length at 7 and to the other movable jaw part 1b at 8. In the preferred form twin spacer shown the fixed jaw parts 1a and 2a are provided one at either end of the spacer body member 3 and face each other as shown and operation of the lever action closure mechanism slides the two movable jaw parts 1b and 2b away from each other and towards the two fixed jaw parts to close the spacer.

Figure 2:
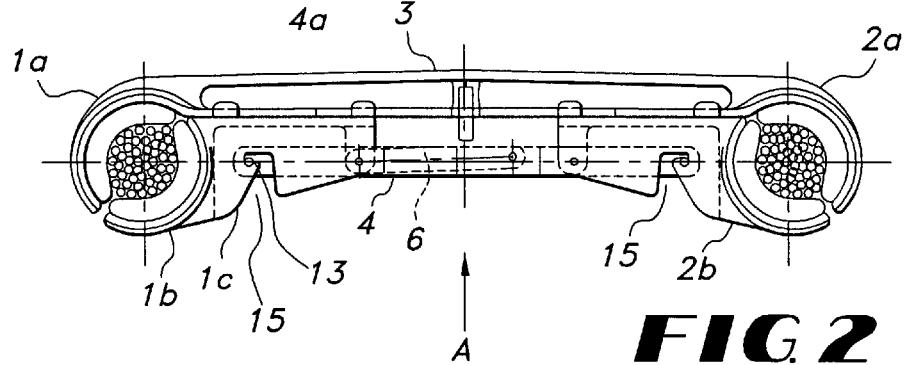
FIG. 2 is a view of the preferred form spacer from one side after operating of the closure lever to close the spacer.
Figure 3:
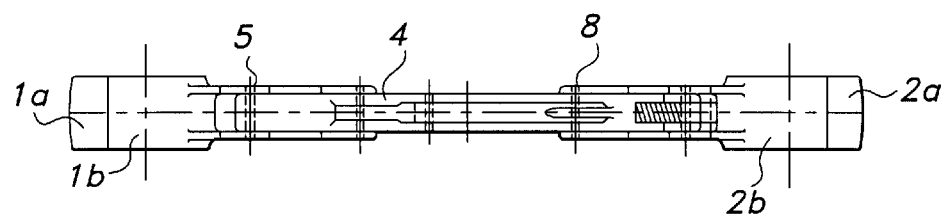
FIG. 3 is a view of the closed spacer in the direction of arrow A in FIG. 2.

The spacer body member 3 having fixed jaw parts 1a and 2a at either end and mounting the movable jaw parts 1b and 2b may have an I or T cross-section in shape and the movable jaw parts 1b and 2b are mounted for sliding movement along the member 3 by legs 9 extending around a web of the I-cross-section body member 3 as shown, so as to capture the movable jaw parts 1b and 2b on the spacer body, while enabling sliding movement in the direction of arrows B when the closure lever 4 is moved in the direction of arrow C in FIG. 1 to its closed position shown in FIG. 2.

In use, to close the spacer after it has been fitted in between .Adjacent lines so that the lines are positioned one between each pair ofjaws, the closure lever 4 is moved in the direction of arrow C, causing the movable jaw parts 1b and 2b to move slidingly away from each other towards, and to close against, the fixed jaw parts 1a and 2a, so that when the spacer is fully closed, the lines will be captured between the two closed jaws on each side of the spacer.

Typically the spacer components will be formed from aluminum or other lightweight material. The spacer jaws mount insulating components 10 formed from rubber or X other non-conducting and preferably resilient material which when the spacer is closed will press tightly around the two lines as shown in FIG. 2.

Figure 4:
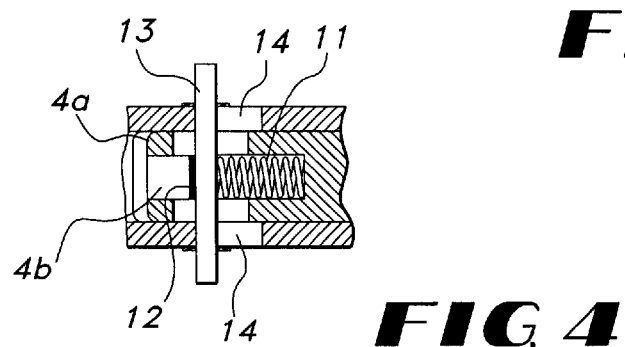
FIG. 4 is a partial view of a cross-section, of the spring-loaded end of the closure lever of FIG. 1, taken perpendicular to the page along the line I-I and viewed in the direction of the arrows as shown.

Preferably the spacer includes means for snap locking the free end 4a of the longer member 4 in position as shown in FIG. 2 when the spacer is closed. Any suitable mechanism may be employed but in the preferred form and referring to FIG. 4, the free end 4a of the lever member 4 comprises an internal bore 4b housing a spring 11 to one end of which is attached a bush 12. A pin 13 extends through the bush 12 and through slots 14 on either side of the end of the lever member as shown. During closing of the lever member 4 the pin 13 engages striker portions 1c on one of the movable jaw parts 1b on either side, depressing the spring 11 in the end of the lever member 4, and then snap locks into the hook shaped recesses 15 on either side as shown in FIG. 2. If required for maintenance or relocation of the spacer, the spacer may be opened by using an L-shaped tool to depress the spring 11 and move the pin 13 out of recesses 15 on either side,en pivot out the end of the lever member 4.

In the preferred form twin spacer described above, one jaw part moves slidingly towards the other jaw part to close each pair of jaws on operation of the lever action closure mechanism, but alternatively for example the two jaws of each pair of jaws may be pivotally mounted relative to one another so that operation of the closure lever will cause the two jaws to pivot towards each other, to close about the lines. Other equivalent mechanical arrangements are possible utilizing a lever action closure mechanism to enable the spacer to be closed about adjacent lines by a lever action in fitting of the spacer.

The preferred form twin spacer shown in the drawing is for fitting between two lines and for example a triple spacer may include three pairs of jaws intended to enable fitting of the spacer to three adjacent lines, with two similar lever action closure mechanisms provided one between each pair of jaws. A quadruple spacer for fitting between four adjacent lines may comprise four pairs of closable jaws and three lever action closure mechanisms between each jaw pair, and so on.

The foregoing describes the invention including a preferred form thereof. Alterations and modifications as will be obvious to those skilled in the art are intended to be incorporated within the scope hereof as defined in the accompanying claims.

We claim:

1. A line spacer for use between lines to maintain the lines at a set spacing from each other, including two spaced jaw parts provided, send of a spacer body member wherein each spaced jaw part comprises a fixed jaw part and a movable jaw part, the spacer body member connecting the two fixed jaw parts and slidingly carrying the two movable jaw parts between the two fixed jaw parts, and a lever action closure mechanism operable to slidingly move the two moveable jaw parts to close the two moveable jaw parts against the two fixed jaw parts after engaging of the spacer onto adjacent lines to fix the spacer in position between the lines.

2. A line spacer according to claim 1 wherein the two fixed jaw parts face one another from either end of the spacer member and the lever action closure mechanism operates between the two movable jaw parts to slidingly move each away from the other and towards the two fixed jaw parts to close the line spacer.

3. A spacer according to claim 2, wherein the lever action closure mechanism comprises a longer member pivotally coupled at one end to one of the two movable jaw parts and having a free end and a length, and a shorter member pivotally coupled between a point intermediate of the length of the longer member and the other movable jaw part.

4. A spacer according to claim 3 including means for snap locking the free end of said longer member against the other of the movable jaw parts when the line spacer is closed.

5. A spacer according to claim 4 wherein the free end of said longer member contains a spring snap locking mechanism.

6. A spacer according to claim 5, wherein said spring snap locking mechanism includes a transverse protrusion on either side of the free end of said longer member which is spring biased towards said free end, which engages hook-shaped recesses on either side of said other of the movable jaw parts when the line spacer is closed.

7. A line spacer for use between lines to maintain the lines at a set spacing from each other, including two spaced jaw parts provided one at either end of a spacer body member wherein each spaced jaw part comprises a fixed jaw part and a movable jaw part, the spacer body member connecting the two fixed jaw parts and slidingly carrying the two movable jaw parts between the two fixed jaw parts and a lever action closure mechanism, comprising a longer member pivotally coupled at one end to one of the two moveable jaw parts and having a free end and a length, and a shorter member pivotally coupled between a point intermediate of the length of the longer member and the other moveable jaw part, said lever action closure mechanism operable to move the two moveable jaw parts to close the two moveable jaw parts against the two fixed jaw parts after engaging of the spacer onto adjacent lines to fix the spacer in position between the lines.

\* \* \* \* \*